No. 621,034. Patented Mar. 14, 1899.
H. J. CORDLE.
TRICYCLE.
(Application filed Nov. 1, 1898.)
(No Model.)
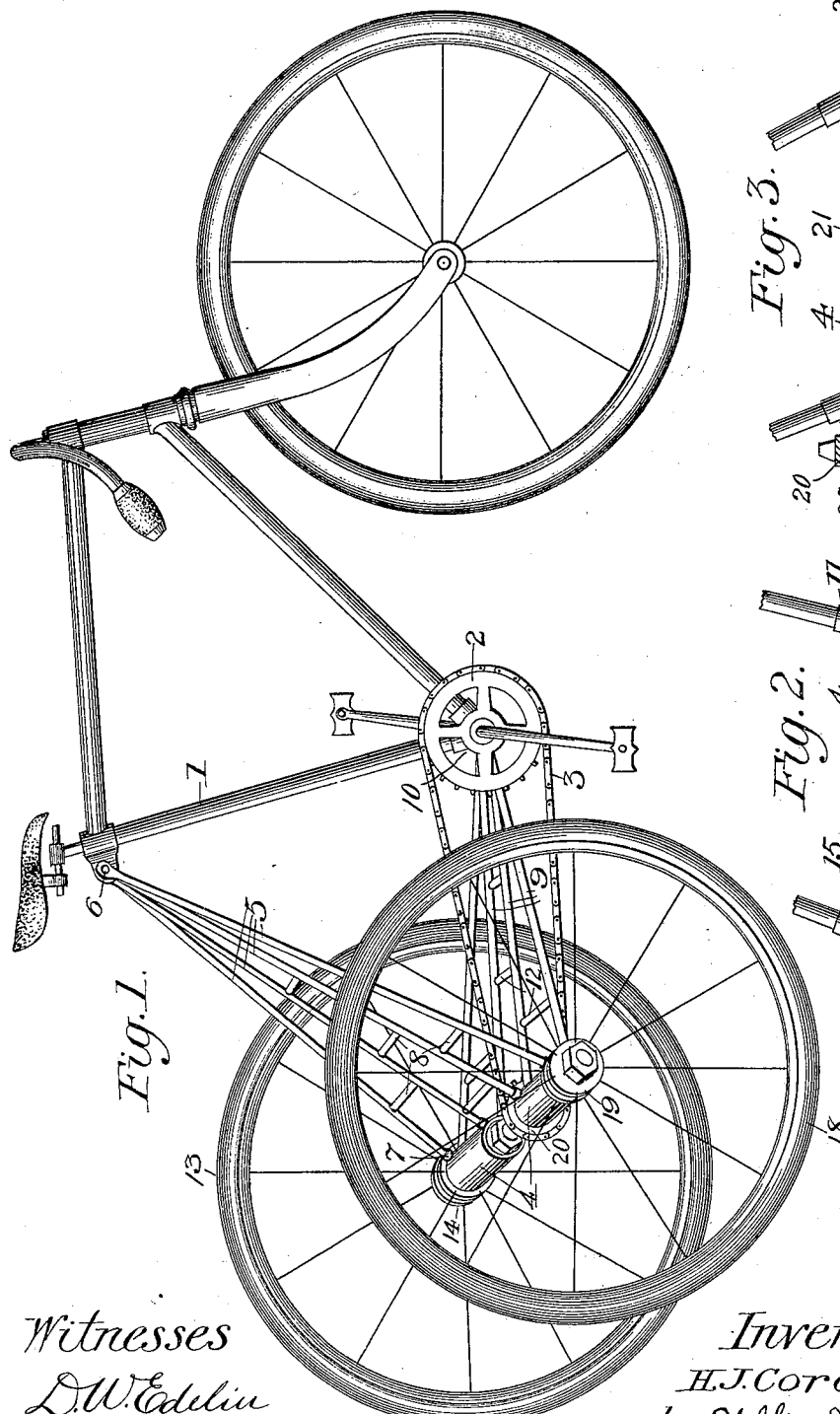
Witnesses
D. W. Edelin
C. K. Berryman
Inventor:
H. J. Cordle.
by Stebbins & Wright.
Attys
THE NORRIS PETERS CO., PHOTO-LITHO., WASHINGTON, D. C.

UNITED STATES PATENT OFFICE.

HAMNER J. CORDLE, OF LITTLETON, NORTH CAROLINA.

TRICYCLE.

SPECIFICATION forming part of Letters Patent No. 621,034, dated March 14, 1899.

Application filed November 1, 1898. Serial No. 695,150. (No model.)

*To all whom it may concern:*

Be it known that I, HAMNER J. CORDLE, a citizen of the United States, residing at Littleton, in the county of Halifax and State of North Carolina, have invented certain new and useful Improvements in Tricycles, of which the following is a specification.

The object of my invention is the production of an improved tricycle which can be propelled with a less expenditure of energy than others heretofore designed, which shall pass around sharp corners and on arcs of short radii without causing one of the rear wheels to slip, which can easily and quickly be taken apart for repairs and with equal facility again assembled, and which shall possess many other desirable characteristics and features of construction and likewise of operation.

With the above ends in view my invention consists in a tricycle having the rear wheels mounted upon independent axles and one of said axles only provided with a sprocket-wheel.

It further consists in a skeleton frame adapted to support the bearing-cylinders for the axles of the rear wheels and made up of small rods or braces united by stays.

Still further, it consists in an axle for the sprocket-wheel and one of the rear wheels provided with supports adjustable relative to the axle.

Finally, it consists in certain novelties of construction and combinations of parts hereinafter described, and specified in the claims.

The accompanying drawings illustrate one example only of the physical embodiment of my invention, and wherein is disclosed the best mode I have so far devised for the application of the principle.

Figure 1 is a view in perspective of my improved tricycle complete, except that a limited number of wheel-spokes only are shown. Fig. 2 is a view in section taken on a horizontal plane through the cylindrical bearing for the axle of the left-hand wheel. Fig. 3 is a sectional view taken in a horizontal plane through the cylindrical bearing for the axle of the sprocket-wheel and the right-hand or driving wheel.

Referring to the figures of the drawings, the numeral 1 designates the seat-mast or saddle-post tube; 2, the front sprocket-wheel; 3, the sprocket-chain; 4, ball-bearing cylinders; 5, oblique rods or braces; 6, a bolt uniting the upper ends of the braces to the seat-mast; 7, lugs or connections on the bearing-cylinders which serve to join the lower ends of the rods to the cylinders; 8, stays which unite the rods or braces one to another; 9, horizontal rods or braces; 10, the crank-hanger or bottom bracket to which the front ends of the horizontal rods or braces are joined; 11, lugs or connections on the bearing-cylinders serving to join the rear ends of the horizontal rods to the bearing-cylinders; 12, stays uniting the horizontal rods one to another; 13, the left-hand rear or loose wheel; 14, the hub of the left-hand rear or loose wheel; 15, the threaded solid axle to which the left-hand-wheel hub is secured; 16, ball-bearings; 17, a nut fitting the threaded end of the solid axle and adapted for locking the ball-bearing cone; 18, the driving-wheel; 19, the driving-wheel hub; 20, the rear sprocket-wheel; 21, a hollow threaded axle; 22, threaded supports adjustable longitudinally in the axle and projecting therefrom; 23, ball-bearings; 24, lugs on the cones of the ball-bearings; 25, seats in the sprocket-wheel to receive the lugs; 26, keys on the threaded supports; 27, seats in the sprocket-wheel which engage the keys; 28, the nuts which confine the sprocket and drive-wheels upon the threaded supports, and 29 designates a hole in the bearing-cylinder through which a tool can be inserted to engage the axle and hold the same stationary when the supports are being adjusted.

The method of assembling and uniting the several parts is quite obvious from an inspection of the drawings and need not be described.

No reference has been made to the front part of the frame of the tricycle, as it is of the usual construction. However, any form can be used in combination with my improvements—a frame as shown or one having a depressed or curved tube uniting the head and seat-mast and adapting the same for ladies.

From the foregoing it will be seen that I have produced an improved tricycle which fulfils all the conditions set forth as the object and end of my invention.

Inasmuch as motion is transmitted by the sprocket-chain to one rear wheel only and the other rear wheel runs loose, a very small amount of energy is required to propel the cycle. Both rear wheels moving independently each of the other, arcs of small radii can be traversed without either wheel slipping, and the details of construction are such that the parts can easily and quickly be disconnected and again assembled when repairs are to be made or when a new member is to be substituted for one worn out or irreparably injured.

While I have shown and described in detail only one example of the physical embodiment of my invention, I do not thereby intend to exclude from the scope of my claims other examples which involve merely colorable changes in construction and mode of operation, inasmuch as manifold substitutions, alterations, and modifications may be introduced at the will of the manufacturer without constituting a substantial departure.

What I claim as new, and desire to secure by Letters Patent, is—

1. A tricycle having the two rear wheels mounted upon independent axles, one being solid and the other hollow and threaded, each of said axles being supported within a ball-bearing cylinder 4 and the hollow and threaded axle provided at its opposite ends respectively with supports for a sprocket-wheel and a driving-wheel; substantially as set forth.

2. A tricycle having the two rear wheels mounted upon independent axles, and one of said axles provided with longitudinally-adjustable supports 22, 22, to which are firmly secured against rotation a sprocket-wheel and a driving-wheel; substantially as set forth.

3. The combination in a tricycle of two rear wheels mounted upon independent axles supported in ball-bearing cylinders 4, 4, oblique rods 5 and horizontal rods 9 joining the cylindrical bearings to the seat-mast and crank-hanger; and stays 8 and 12 uniting the rods; in substance as set forth.

4. The combination in a tricycle of rear wheels adapted to revolve independently one of the other; ball-bearing cylinders 4, 4, and axles; one of said axles being solid and having secured to its projecting end a wheel; and the other axle supporting at its ends through the medium of adjustable supports 22, 22, and outside the bearing a sprocket-wheel and a driving-wheel; in substance as set forth.

In testimony whereof I affix my signature in presence of two witnesses.

HAMNER J. CORDLE.

Witnesses:
J. J. WILLIAMS,
A. G. BABBITT.